United States Patent
Komatsuzaki

(10) Patent No.: US 11,255,969 B2
(45) Date of Patent: Feb. 22, 2022

(54) MEASUREMENT APPARATUS AND MEASUREMENT METHOD

(71) Applicant: Mitutoyo Corporation, Kanagawa (JP)

(72) Inventor: Shinji Komatsuzaki, Ibaraki (JP)

(73) Assignee: Mitutoyo Corporation, Kanagawa (JP)

( * ) Notice: Subject to any disclaimer, the term of this patent is extended or adjusted under 35 U.S.C. 154(b) by 230 days.

(21) Appl. No.: 16/549,888

(22) Filed: Aug. 23, 2019

(65) Prior Publication Data

US 2020/0064477 A1  Feb. 27, 2020

(30) Foreign Application Priority Data

Aug. 23, 2018 (JP) .............................. JP2018-156327
Jul. 22, 2019 (JP) .............................. JP2019-134430

(51) Int. Cl.
| | | |
|---|---|---|
| *G01C 3/08* | (2006.01) | |
| *G01S 17/34* | (2020.01) | |
| *G01S 7/4915* | (2020.01) | |
| *G01S 7/4861* | (2020.01) | |

(52) U.S. Cl.
CPC ............ *G01S 17/34* (2020.01); *G01S 7/4861* (2013.01); *G01S 7/4915* (2013.01)

(58) Field of Classification Search
CPC ....... G01S 17/34; G01S 7/4861; G01S 7/4915
See application file for complete search history.

(56) References Cited

U.S. PATENT DOCUMENTS

2003/0160148 A1* 8/2003 Yao ........................ H01S 5/0683
250/205
2017/0343652 A1* 11/2017 de Mersseman ....... G01S 17/58

FOREIGN PATENT DOCUMENTS

| EP | 1645890 A1 * | 4/2006 | ........... G01S 7/4915 |
| JP | 3583906 | 8/2004 | |

OTHER PUBLICATIONS

Takefumi Hara; "Distance Sensing by FSL Laser and Its Application"; Optonews; vol. 7, No. 3; 2012, 10 pgs. (with English translation).

* cited by examiner

*Primary Examiner* — Mark Hellner
(74) *Attorney, Agent, or Firm* — Oblon, McClelland, Maier & Neustadt, L.L.P.

(57) ABSTRACT

A measurement apparatus including a laser apparatus; a branching part that branches the frequency modulated laser beam into a reference light and a measurement light; a beat signal generation part that generates a beat signal by mixing the reflected light reflected by irradiating the measurement light to an object to be measured; and a detection part that performs frequency analysis on first sampling data generated by sampling the beat signal at a first frequency and second sampling data generated by sampling the beat signal at a second frequency obtained by dividing a resonance frequency of the laser resonator by a positive integer, wherein the first frequency is a frequency equal to the resonance frequency or being a frequency equal to or more than twice the resonance frequency of the laser resonator and a measurement method are provided.

12 Claims, 11 Drawing Sheets

MEASUREMENT APPARATUS AND MEASUREMENT METHOD

CROSS-REFERENCE TO RELATED APPLICATIONS

The present application claims priority to Japanese Patent Application number 2018-156327, filed on Aug. 23, 2018 and Japanese Patent Application number 2019-134430, filed on Jul. 22, 2019. The contents of this application are incorporated herein by reference in their entirety.

BACKGROUND

A frequency-shifted feedback laser (FSFL) which is provided with a frequency shifter in a resonator and outputs a plurality of longitudinal-mode lasers whose oscillation frequencies vary linearly with time is known. Also, an optical distance meter using such an FSFL is known (see, e.g., Patent Document 1, the Specification of Japanese Patent. No. 3583906 and Non-Patent Document 1, "Distance Sensing by FSF Laser and Its Application," by Takefumi HARA, Optonews, Vol. 7, No. 3, 2012, pp. 25-31).

An optical distance meter using a frequency-shifted feedback laser (FSFL) can acquire a large amount of three-dimensional information in a contactless manner, and has been used, for example, in design and production sites. It has been desired that such an optical distance meter can perform measurement with higher accuracy while suppressing a reduction in throughput.

SUMMARY

The present invention focuses on this point, and an object of the invention is to improve measurement accuracy while suppressing the reduction in throughput of the measurement apparatus using the FSFL.

Means for Solving the Problems

A measurement apparatus according to the present invention includes: a laser apparatus having a laser resonator including a frequency shifter and a gain medium and outputting a frequency modulated laser beam with a plurality of modes; a branching part that branches a part of the frequency modulated laser beam output by the laser apparatus as a reference light and at least some of the remaining part of the frequency modulated laser beam as a measurement light; a beat signal generation part that generates a beat signal by mixing the reflected light reflected by irradiating the measurement light to an object to be measured and the reference light; and a detection part that detects a difference between propagation distances of the reference light and the measurement light by performing frequency analysis on (i) first sampling data generated by sampling the beat signal at a first frequency and (ii) second sampling data generated by sampling the beat signal at a second frequency obtained by dividing a resonance frequency of the laser resonator by a positive integer, wherein the first frequency being a frequency equal to the resonance frequency or being a frequency equal to or more than twice the resonance frequency of the laser resonator is provided.

A measurement method according to the present invention includes steps of: outputting a frequency modulated laser beam with a plurality of modes from a laser apparatus that has a laser resonator including a frequency shifter and a gain medium; branching a part of the frequency modulated laser beam as a reference light and at least some of the remaining part of the frequency modulated laser beam as a measurement light; generating a beat signal by mixing the reflected light reflected by irradiating the measurement light to an object to be measured and the reference light; generating first sampling data by sampling the beat signal at a frequency equal to the resonant frequency of the laser resonator or at a first frequency being equal to or more than twice the resonant frequency of the laser resonator; generating second sampling data by sampling the beat signal at a second frequency obtained by dividing a resonance frequency of the laser resonator by a positive integer; and detecting a difference between propagation distances of the reference light and the measurement light based on frequency analysis results of the first sampling data and the second sampling data is provided.

DETAILED DESCRIPTION

Hereinafter, the present invention will be described through exemplary embodiments of the present invention, but the following exemplary embodiments do not limit the invention according to the claims, and not all of the combinations of features described in the exemplary embodiments are necessarily essential to the solution means of the invention.

Configuration Example of the Measurement Apparatus 100

Figure 1:
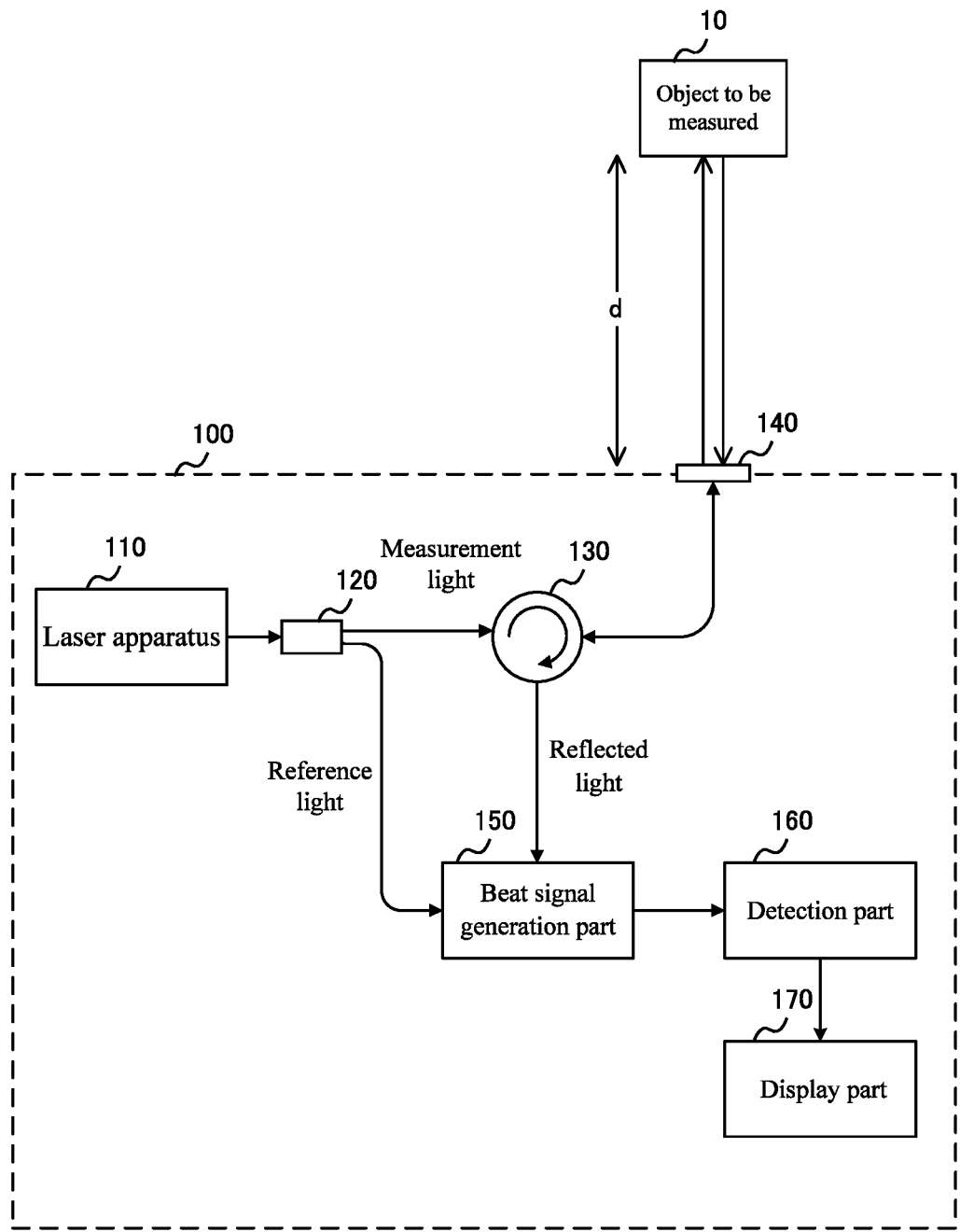
FIG. 1 shows a configuration example of a measurement apparatus 100 according to the present embodiment together with an object to be measured 10.

FIG. 1 shows a configuration example of a measurement apparatus 100 according to the present embodiment together with an object to be measured 10. The measurement apparatus 100 optically measures a distance between the measurement apparatus 100 and the object to be measured 10. Also, the measurement apparatus 100 may measure the three-dimensional shape of the object to be measured 10 by scanning a position of the laser beam irradiated onto the object to be measured 10. The measurement apparatus 100 includes a laser apparatus 110, a branching part 120, an optical circulator 130, an optical head part 140, a beat signal generation part 150, a detection part 160, and a display part 170.

The laser apparatus 110 has a laser resonator and outputs a frequency modulated laser beam with a plurality of modes. The laser apparatus 110 is provided with a frequency shifter in a resonator, and outputs a plurality of longitudinal mode lasers whose oscillation frequencies change linearly with the passage of time. The laser apparatus 110 is, for example, a frequency-shifted feedback laser (FSFL). The FSFL will be described later.

The branching part 120 branches the frequency modulated laser beam output from the laser apparatus 110, with a part of it as a reference light and at least some of the remaining part of it a measurement light. The branching part 120 is, for example, a fiber optic coupler. In the example of FIG. 1, the branching part 120 supplies the measurement light to the optical circulator 130 and supplies the reference light to the beat signal generation part 150.

The optical circulator 130 has a plurality of input/output ports. For example, the optical circulator 130 outputs a light, input from one port, to the next port, and outputs a light, input from the next port, to the port after next. FIG. 1 shows an example in which the optical circulator 130 has three input/output ports. In this case, the optical circulator 130 outputs the measurement light supplied from the branching part 120 to the optical head part 140. Also, the optical circulator 130 outputs a light input from the optical head part 140) to the beat signal generation part 150.

The optical head part 140 irradiates the light input from the optical circulator 130 toward the object to be measured 10. The optical head part 140 includes, for example, a collimator lens. In this case, the optical head part 140 first adjusts the light input from the optical circulator 130 via an optical fiber into a beam shape by the collimator lens, and then outputs the light.

Also, the optical head part 140 receives a reflected light of the measurement light irradiated on the object to be measured 10. The optical head part 140 focuses the received reflected light onto the optical fiber by a collimator lens and supplies it to the optical circulator 130. In this case, the optical head part 140 may include one common collimator lens, and the collimator lens may irradiate the object to be measured 10 with the measurement light, and may receive the reflected light from the object to be measured 10. The distance between the optical head part 140 and the object to be measured 10 is defined as d.

Alternatively, the optical head part 140 may include a condenser lens. In this case, the optical head part 140 focuses the light input from the optical circulator 130 via the optical fiber on the surface of the object to be measured 10. The optical head part 140 receives at least a part of the reflected light reflected on the surface of the object to be measured 10. The optical head part 140 focuses the received reflected light onto an optical fiber using the condenser lens and supplies the light to the optical circulator 130. Also in this case, the optical head part 140 may include one common condenser lens and may irradiate the object to be measured 10 with the measurement light using the condenser lens, and may receive the reflected light from the object to be measured 10.

The beat signal generation part 150 receives, from the optical circulator 130, the reflected light being the measurement light irradiated onto and reflected from the object to be measured 10. Also, the beat signal generation part 150 receives the reference light from the branching part 120. The beat signal generation part 150 mixes the reflected light and the reference light to generate a beat signal. The beat signal generation part 150 includes, for example, a photoelectric conversion element, converts the beat signal into an electric signal, and outputs the electric signal.

Here, since the reflected light has travelled back and forth across the distance from the optical head part 140 to the object to be measured 10, a difference in a propagation distance corresponding to at least the distance 2d occurs as compared with the reference light. Since the oscillation frequency of the light output from the laser apparatus 110 changes linearly with the passage of time, a frequency difference dependent on a propagation delay corresponding to the difference in the propagation distance occurs in the oscillation frequencies of the reference light and the reflected light. The beat signal generation part 150 generates a beat signal corresponding to such a frequency difference.

The detection part 160 detects the difference in propagation distance between the reference light and the measurement light by frequency-analyzing the beat signal generated by the beat signal generation part 150. The detection part 160 samples the beat signal at different sampling frequencies and performs frequency analysis on the beat signal. The frequency analysis of the detection part 160 will be described below.

The display part 170 displays an analysis result of the detection part 160. The display part 170 may include a display or the like to display the detection result. The display part 170 may store the analysis result in a storage unit or the like.

The measurement apparatus 100 described above can measure the distance between the measurement apparatus 100 and the object to be measured 10 by analyzing the frequency difference between the reflected light of the measurement light radiated onto the object to be measured 10 and the reference light. That is, the measurement apparatus 100 can form a non-contact and non-destructive optical distance meter.

Next, a more detailed configuration of the measurement apparatus 100 will be described.

Configuration Example of the Laser Device 110

Figure 2:
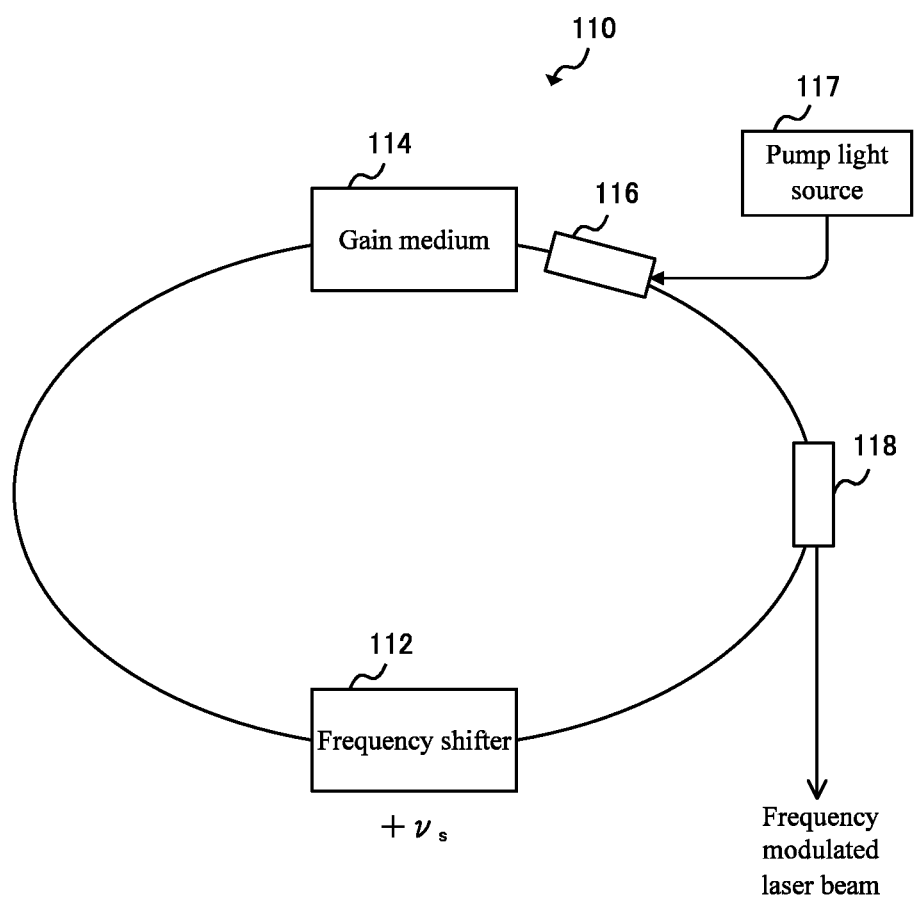
FIG. 2 shows a configuration example of a laser apparatus 110 according to the present embodiment.

FIG. 2 shows a configuration example of the laser apparatus 110 according to the present embodiment. The laser apparatus 110 of FIG. 2 shows an example of the FSFL. The laser apparatus 110 includes a laser resonator and oscillates a laser beam in the laser resonator. The laser resonator of the laser apparatus 110 includes a laser resonator including a frequency shifter 112, a gain medium 114, a WDM coupler 116, a pump light source 117, and an output coupler 118.

By an approximately constant frequency, the frequency shifter 112 shifts a frequency of a light to be input. The frequency shifter 112 is, for example, an acousto-optic frequency shifter (AOFS) having acousto-optic elements. Here, an amount of the frequency shift by the frequency shifter 112 is set to $+v_s$. That is, the frequency shifter 112 shifts the frequency of the light circulating around the resonator to increase the frequency by $v_s$ for each round.

The gain medium 114 is supplied with a pump light and amplifies the input light. The gain medium 114 is, for example, an optical fiber doped with impurities. The impurities are, for example, rare earth elements such as erbium, neodymium, ytterbium, terbium, thulium, or the like. The gain medium 114 is supplied with the pump light from the pump light source 117 via the WDM coupler 116. The output coupler 118 outputs, to an external device, a part of the light that has been laser oscillated in the resonator.

That is, the laser apparatus 110 shown in FIG. 2 contains a fiber ring laser having the frequency shifter 112 in the resonator. The laser apparatus 110 preferably further includes an isolator in the resonator. Also, the laser apparatus 110 may have an optical bandpass filter that passes light of a predetermined wavelength band in the resonator. Frequency characteristics of the laser beam output from the laser apparatus 110 will be described below.

Figure 3:
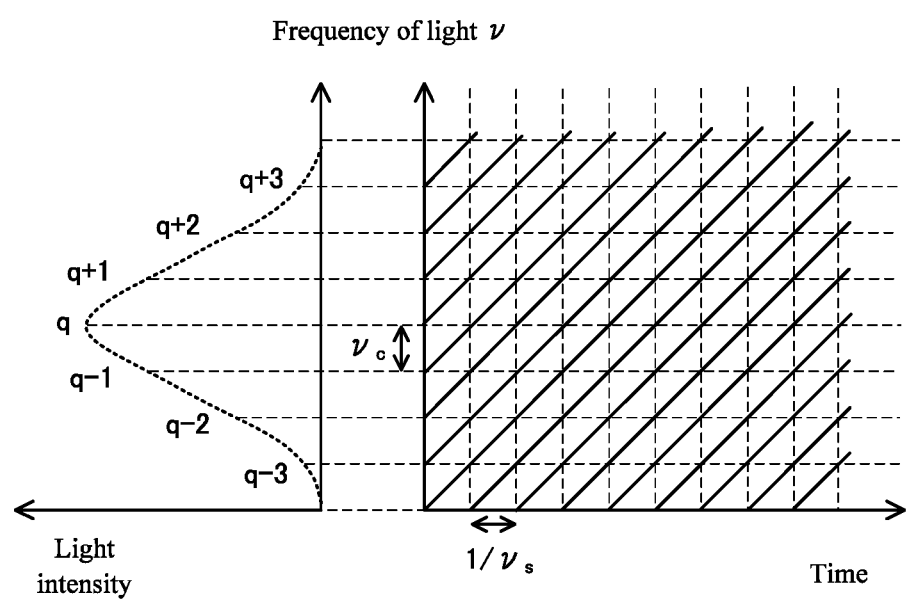
FIG. 3 shows an example of laser beam output from the laser apparatus 110 according to the present embodiment.

FIG. 3 shows an example of the laser beam output from the laser apparatus 110 according to the present embodiment. FIG. 3 shows, on the left, a light spectrum of the laser beam output by the laser apparatus 110 at the time to. In the light spectrum, the horizontal axis indicates the light intensity, and the vertical axis indicates the frequency of light. Also, a plurality of longitudinal modes of the light spectrum are denoted by the numbers q. The frequencies of the plurality of longitudinal modes are arranged at approximately constant frequency intervals. Supposing that $\tau_{RT}(=1/\nu_C)$ denotes the time for light to go around the resonator, the plurality of longitudinal modes are arranged at intervals of $1/\tau_{RT}(=\nu_C)$, as represented by the following equation. It should be noted that $\nu_0$ is the initial frequency of the light spectrum at the time $t_0$.

$$v_q(t_0) = v_0 + \frac{q}{\tau_{RT}} \quad \text{[Equation 1]}$$

FIG. 3 shows, on the right, changes in frequencies with the passage of time of the plurality of longitudinal modes output by the laser apparatus 110. On the right side of FIG. 3, the horizontal axis indicates the time and the vertical axis indicates the frequency. That is, FIG. 3 shows a change over time in the frequency of the laser beam output from the laser apparatus 110 on the right side, and shows an instantaneous frequency of the laser beam at the time $t_0$ on the left side.

In the laser apparatus 110, each time the light in the resonator goes around the resonator, the frequency shifter 112 increases the frequency of the light traveling around the resonator by $\nu_s$. That is, since the frequency of each of the modes increases by $\nu_s$ for every passing of $\tau_{RT}$, the time change dv/dt of the frequency becomes approximately equal to $\nu_s/\tau_{RT}$. Therefore, the plurality of longitudinal modes represented by Equation 1 change as the following equation with the passage of time t.

$$v_q(t) = v_0 + \frac{v_s}{\tau_{RT}}t + \frac{q}{\tau_{RT}} \quad \text{[Equation 2]}$$

[Details of a Distance Measurement Process]

The measurement apparatus 100 according to the present embodiment measures the distance d between the optical head part 140 and the object to be measured 10 by using the laser apparatus 110 that outputs the frequency elements represented by Equation 2. Suppose that an optical path difference between the reference light and the reflected light is only the distance 2d, which is the reciprocated distance d, and the propagation delay corresponding to the distance 2d is Δt. That is, when the measurement light is reflected and returned from the object to be measured 10 at the time t, the frequency of the returned reflected light approximately matches the past frequency that is a time Δt earlier than the time t, and therefore can be expressed by the following equation.

$$v_q(t-\Delta t) = v_0 + \frac{v_s}{\tau_{RT}}(t-\Delta t) + \frac{q}{\tau_{RT}} \quad \text{[Equation 3]}$$

Meanwhile, the reference light at the time t can be expressed by the following equation in a similar manner as with Equation 2, where the reference light is $v_{q'}(t)$.

$$v_{q'}(t) = v_0 + \frac{v_s}{\tau_{RT}}t + \frac{q'}{\tau_{RT}} \quad \text{[Equation 4]}$$

Because the beat signal generation part 150 superimposes the reflected light and the reference light, a plurality of beat signals between the plurality of longitudinal modes expressed by Equation 3 and the plurality of longitudinal modes expressed by Equation 4 are generated. Supposing that the frequencies of such beat signals are $v_B(m, d)$, $v_B(m, d)$ can be expressed by the following equation from Equations 3 and 4, where m is an interval of the longitudinal mode numbers (=q−q') and Δt=2d/c.

$$v_B(m, d) = v_{q'}(t) - v_q(t-\Delta t) = \frac{v_s}{\tau_{RT}} \cdot \frac{2d}{c} - \frac{m}{\tau_{RT}} \quad \text{[Equation 5]}$$

From Equation 5, the distance d is expressed by the following equation, where $1/\tau_{RT} = v_c$.

$$d = \frac{c}{2v_s v_c}\{v_B(m, d) + mv_c\} \quad \text{[Equation 6]}$$

From Equation 6, it can be understood that the distance d can be calculated from a frequency observation result of the beat signal by determining the interval m of the longitudinal mode numbers. It should be noted that the interval m can be determined by detecting a change in beat signals when the amount of frequency shift $v_s$ of the laser apparatus 110 is changed. Since such a method of determining the interval m is known, as described in Patent Document 1 or the like, its detailed description is omitted.

Since the observed beat signal is always a positive frequency, in calculation, the beat signal generated on the negative frequency side is folded back on the positive side and observed as an image signal. Next, the generation of such an image signal will be described.

Figure 4:
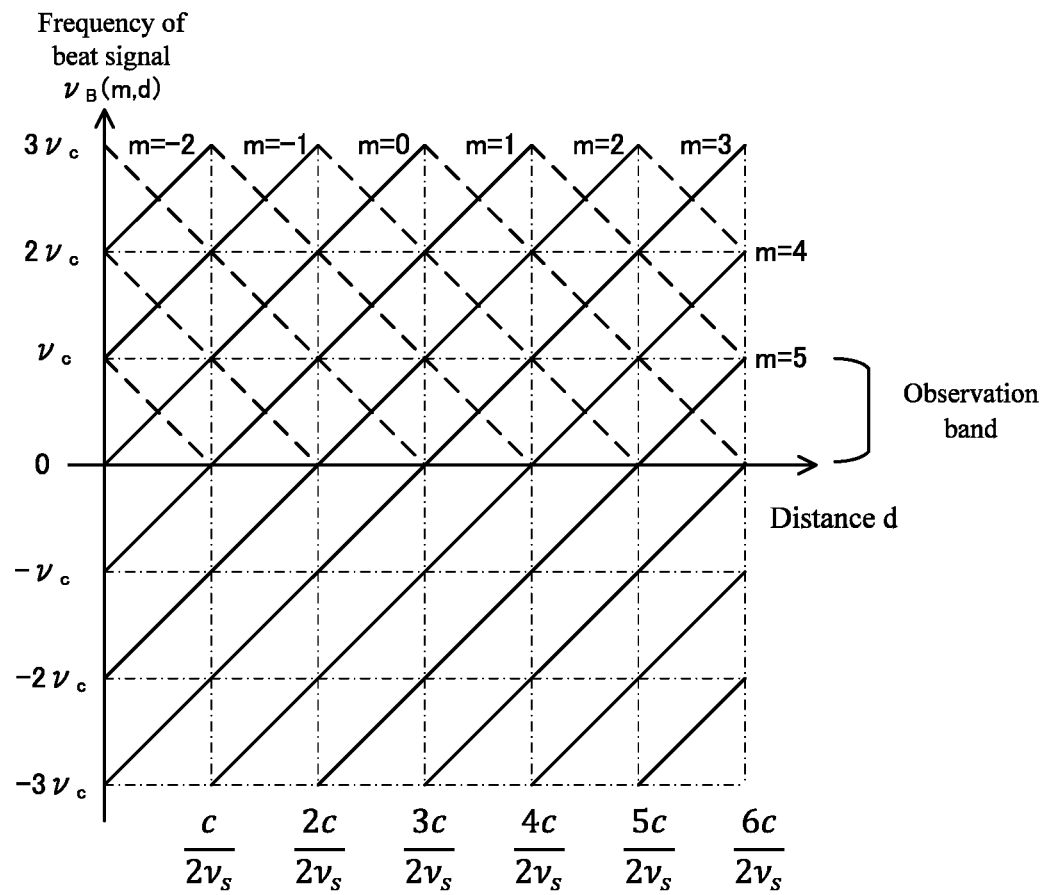
FIG. 4 shows an example of a relationship between (i) a frequency of the beat signal detected by the measurement apparatus 100 according to the present embodiment and (ii) a distance d between the optical head part 140 and the object to be measured 10.

FIG. 4 shows an example of the relationship between the frequency of the beat signal detected by the measurement apparatus 100 according to the present embodiment and the distance d between the optical head part 140 and the object to be measured 10. In FIG. 4, the horizontal axis indicates the distance d, and the vertical axis indicates the frequency $v_B(m, d)$ of the beat signal. The plurality of straight lines shown by the solid lines in FIG. 4 are graphs showing the relation of the frequency $v_B(m, d)$ of the beat signal with respect to the distance d for each of the plurality of m, as shown in Equation 5.

As shown in FIG. 4, a plurality of beat signals corresponding to the value of m are generated. However, since the plurality of longitudinal modes included in each of the reflected light and the reference light are arranged at approximately constant frequency intervals $v_c$, a plurality of beat signals having equal values of m are superimposed on the approximately same frequency on the frequency axis. For example, when a frequency band between frequencies 0 and $v_c$ is observed, a plurality of beat signals are superimposed on approximately the same frequency and are observed as a single line spectrum.

In addition, the frequency $v_B(m, d)$ of the beat signal in the negative range smaller than 0 is further observed as the image signal. That is, the graph of the region in which the vertical axis of FIG. 4 is smaller than 0 is folded back with a frequency 0 as a boundary. FIG. 4 shows the folded image signal by a plurality of dotted lines. Since only the positive and negative of the folded image signals are inverted, the image signals are superimposed on the observed frequency axis at the same frequency as the absolute value of the frequency before being folded. For example, when a frequency band between frequencies 0 and $v_c$ is observed, the beat signal and the image signal are respectively located at different frequencies unless the frequencies of the beat signal and the image signal become $v_c/2$.

As described above, in the observation band between the frequencies 0 and $v_e$, two line spectra are generated, which are (i) the beat signal $v_B(m, d)$ and (ii) the image signal $v_B(m', d)$ whose value of m is different from that of the beat signal $v_B(m, d)$. Here, as an example, m'=m+1. In this case, the beat signal generation part 150 can cancel such an image signal by using a quadrature detection. Next, the beat signal generation part 150 and the detection part 160 using the quadrature detection will be described.

Figure 5:
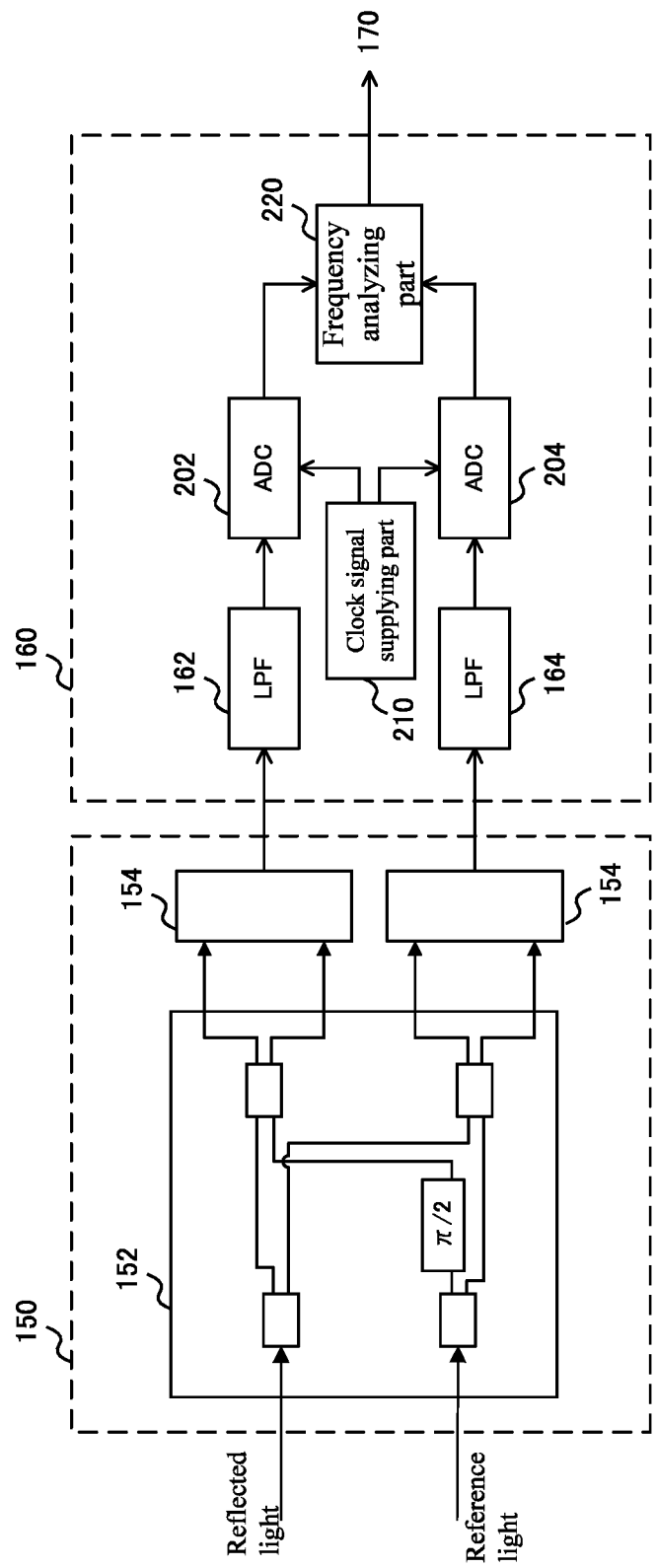
FIG. 5 shows a configuration example of a beat signal generation part 150 and a detection part 160 according to the present embodiment.

FIG. 5 shows a configuration example of the beat signal generation part 150 and the detection part 160 according to the present embodiment. The beat signal generation part 150 quadrature detects the reflected light and the reference light. The beat signal generation part 150 includes an optical 90-degree hybrid 152 and two photoelectric conversion parts 154.

The optical 90-degree hybrid 152 respectively branches the input reflected light and the input reference light into two. The optical 90-degree hybrid 152 multiplexes one of the branched reflected lights and one of the branched reference lights with an optical coupler or the like to generate the first beat signal. The optical 90-degree hybrid 152 multiplexes the other branched reflected light and the other branched reference light by the optical coupler or the like to generate the second beat signal. Here, the optical 90-degree hybrid 152 generates a beat signal after generating a phase difference of 90 degrees between the two branched reference lights. For example, the optical 90-degree hybrid 152 multiplexes one of the two branched reference lights with the reflected light after passing through π/2 wavelength plate.

The photoelectric conversion part 154 receives the multiplexed reflected light and reference light and convert them into electrical signals. The photoelectric conversion part 154 may be a photodiode or the like. The photoelectric conversion part 154 is, for example, a balanced photodiode. In FIG. 5, suppose that one of two photoelectric conversion parts 154 generates the first beat signal and the other photoelectric conversion part 154 generates the second beat signal. As described above, the beat signal generation part 150 performs the quadrature detections by multiplexing two reference lights and two reflected lights having phases differing by 90 degrees, respectively, and outputs two beat signals to the detection part 160.

The detection part 160 performs frequency analysis on the two beat signals. Here, an example in which the detection part 160 performs frequency analysis using the first beat signal as a signal I and the second beat signal as a signal Q will be described. The detection part 160 includes the first filter part 162, the second filter part 164, the first AD conversion part 202, the second AD conversion part 204, a clock signal supplying part 210, and a frequency analyzing part 220.

The first filter part 162 and the second filter part 164 reduce signal components in a frequency band differing from a frequency band that a user or the like wants to analyze. Here, the frequency band that the user or the like wants to analyze is set from 0 to $v_c$. The first filter part 162 and the second filter part 164 are, for example, low-pass filters that pass signal components having a frequency equal to or less than $v_c$. In this case, the first filter part 162 supplies the first beat signal obtained by reducing the signal components having a frequency higher than the frequency $v_c$ to the first AD conversion part 202. Also, the second filter part 164 supplies the second beat signal obtained by reducing the signal components having a frequency higher than the frequency $v_c$ to the second AD conversion part 204.

The first AD conversion part 202 and the second AD conversion part 204 convert analog signals to be input into digital signals. For example, the first AD conversion part 202 converts the first beat signal into a digital signal, and the second AD conversion part 204 converts the second beat signal into a digital signal. The clock signal supplying part 210 supplies clock signals to the first AD conversion part 202 and the second AD conversion part 204. By this, the first AD conversion part 202 and the second AD conversion part 204 convert the analog signals into the digital signals at approximately the same sampling rate as the frequency of the received clock signal.

Here, when the observation band is from 0 to $v_c$, the frequency of the beat signals is at most the resonant frequency $v_c$ of the laser resonator. Therefore, the clock signal supplying part 210 supplies clock signals having a frequency equal to or more than twice the resonant frequency $v_c$ of the laser resonator to the first AD conversion part 202 and the second AD conversion part 204, whereby the beat signals can be observed. Here, the frequency of two times or more of the resonant frequency $v_c$ shall be the first frequency. In this manner, the detection part 160 performs frequency analysis on the first beat signal and the second beat signal being generated by sampling the beat signals at the first frequency, as first sampling data.

The frequency analyzing part 220 converts the first beat signal and the second beat signal into frequency data. As an example, the frequency analyzing part 220 performs a digital Fourier transform (DFT) on the first beat signal and the second beat signal. The frequency analyzing part 220 adds the first beat signal converted into the frequency data as the real part, adds the second beat signal converted into the frequency data as the imaginary part, and cancels the image signal. The quadrature detection in the beat signal generation part 150 and the frequency analysis in the detection part 160 will be described below.

After the beat signals are converted into the digital signals, the detection part 160 may configure the frequency analyzing part 220 using an integrated circuit or the like. For example, the detection part 160 may include a field programmable gate array (FPGA), a digital signal processor (DSP), and/or a central processing unit (CPU).

When at least a part of the detection part 160 is configured by a computer or the like, the detection part 160 includes the storage unit and the control unit. The storage unit includes, for example, a read only memory (ROM) storing a basic input output system (BIOS) or the like of a computer or the like that realizes the frequency analyzing part 220, and a random access memory (RAM) serving as work areas. The storage unit may store various pieces of information including an operating system (OS), application programs, and/or a database to be referred to at the time of executing the application programs. That is, the storage unit may include a large-capacity storage device like a hard disk drive (HDD) and/or a solid state drive (SSD).

The control unit is a processor such as a CPU, and functions as the frequency analyzing part 220 by executing programs stored in the storage unit. The control unit may include a graphics processing unit (GPU) or the like.

Figure 6:
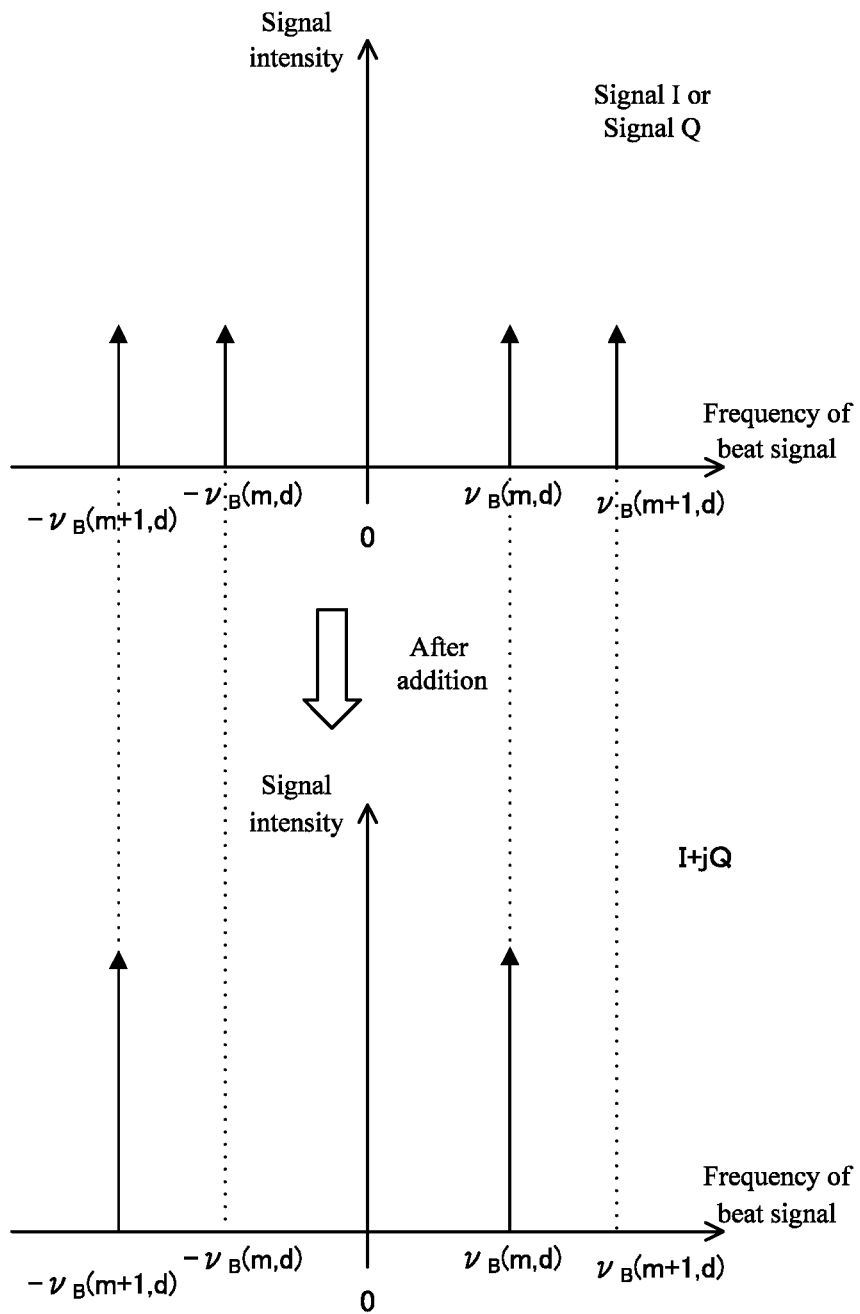
FIG. 6 shows an example of an outline of a quadrature detection by the beat signal generation part 150 and the detection part 160 according to the present embodiment.

FIG. 6 shows an example of an outline of quadrature detection by the beat signal generation part 150 and the detection part 160 according to the present embodiment. In FIG. 6, the horizontal axis indicates the frequency of the beat signal, and the vertical axis indicates the signal intensity. FIG. 6 shows a frequency spectrum of one of the signal I and the signal Q. The frequency spectra of both the signals I and Q have approximately the same spectral shape, as shown in the upper part of FIG. 6. In the signal I and the signal Q, for example, a beat signal $v_B(m, d)$ and an image signal $v_s(m+1, d)$ are observed in a frequency band between the frequencies 0 and $v_c$. In this case, in the signals I and Q, a beat signal $-v_B(m, d)$ and an original beat signal $-v_B(m+1, d)$ of the image signal exist in a frequency band between the frequencies 0 and $-v_c$ on the negative side.

Here, since the signal I and the signal Q are signal components being quadrature detected by the beat signal generation part 150, they include different phase information even if the spectral shapes are the same. For example, in the frequency band between the frequencies 0 and $v_c$ on the positive side, phases of the image signals $v_B(m+1, d)$ of the signal I and the signal Q are mutually inverted. Similarly, in the frequency band between the frequencies 0 and $-v_c$ on the negative side, phases of the beat signals $-v_B(m, d)$ of the signals I and Q are mutually inverted.

Therefore, as shown in the lower part of FIG. 6, when the frequency analyzing part 220 calculates I+jQ using the signal I and the signal Q, the beat signals of the frequency $v_B(m, d)$ strengthen each other and the image signals of the frequency $v_B(m+1, d)$ cancel each other out in the frequency band between the frequencies 0 and $v_c$. Similarly, in the frequency band between the frequencies 0 and $-v_c$, the beat signals of the frequency $-v_B(m+1, d)$ strengthen each other and the beat signals of the frequency $-v_B(m, d)$ cancel each other out.

According to the frequency analysis result of the frequency analyzing part 220, one beat signal is observed for the frequency $v_B(m, d)$ in the frequency band between the frequencies 0 and $v_c$. Since the measurement apparatus 100 can cancel out the image signal in this manner, the distance d between the optical head part 140 and the object to be measured 10 can be measured.

Here, the distance d measured by the measurement apparatus 100 is expressed by Equation 6. That is, the larger the values of $v_s$ and $v_c$, the smaller the effect of measurement accuracy of the signal frequency $v_B(m, d)$ of the beat signal on measurement accuracy of the distance d. In addition, since $v_c$ may also include a measuring error, it is preferable that the value of m is smaller. It can be seen from the examples of FIG. 4 that when the distances d are the same, the smaller the $v_s$, the smaller the value of m becomes. Therefore, it is preferable to increase the value of $v_c$ as compared with increasing the value of $v_s$ in order to improve measurement accuracy of the distance d. However, since $v_c$ is the frequency at which beat signals are maximized in the observation band, increasing the value of $v_c$ corresponds to increasing the sampling frequency.

Also, measurement accuracy of $v_B(m, d)$ and $v_c$ is greatly affected by frequency resolution, which is the reciprocal of the sample times. That is, in order to improve measurement accuracy of $v_B(m, d)$ and $v_c$, it is preferable to extend the sampling time.

As described above, in order to improve measurement accuracy of the distance d, it is preferable to sample the beat signals at a higher sampling frequency for a longer sampling time, and therefore the number of pieces of sample data would increase. As the number of pieces of sample data increases, the time involved in the frequency analysis becomes longer, so that the distance measurement by the first sampling data may reduce the throughput.

Here, the number of beat signals to be observed is one in the observation band, and a signal spectrum width of the beat signal is about several hundred kHz. In this case, it is conceivable to reduce the number of pieces of sample data by combining undersampling with a reduced sampling frequency in addition to normal oversampling. Such undersampling will be described below.

[Undersampling]

Figure 7:
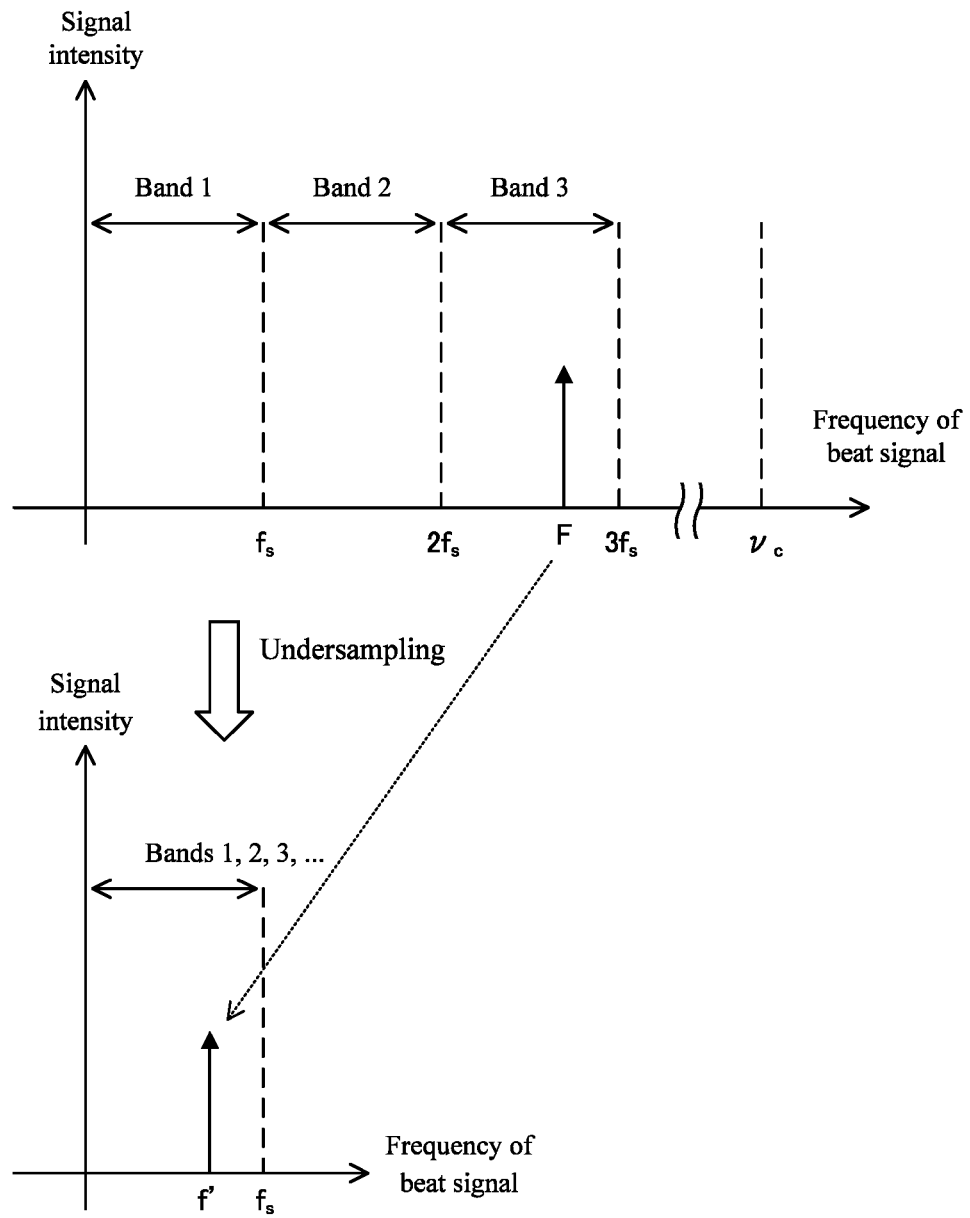
FIG. 7 shows an example of an outline of undersampling of the detection part 160 according to the present embodiment.

FIG. 7 shows an example of an outline of undersampling of the detection part 160 according to the present embodiment. The upper diagram of FIG. 7 shows the frequency band to be observed from the frequencies 0 to $v_c$, which can be detected by sampling using the first frequency. Here, the frequency band from 0 to $v_c$ is defined as the first frequency band. In addition, the observation band of undersampling by a sampling frequency $f_s$ is set from 0 to $f_s$, where a frequency band from 0 to $f_s$ is defined as the second frequency band. It should be noted that $f_s < v_c$. FIG. 7 shows an exemplary case in which the first frequency band is divided into a plurality of pieces by a bandwidth $f_s$ of the second frequency band. In FIG. 7, the plurality of bands are Band 1, Band 2, and so forth, from the low frequency side. Also, an example in which a beat signal exists at a frequency F included in Band 3 is shown.

The lower diagram of FIG. 7 shows an exemplary frequency-band $f_s$ observed by undersampling. The signal component of the frequency band $f_s$ is a result of superimposing the signal components of the plurality of divided Bands 1, 2, and so forth. In addition, an example in which the beat signal is observed at the frequency f' is shown. Here, when observed by undersampling, the frequency f' and the frequency F in the first frequency band, which is the original observation band, can be expressed by the relationship of the following equation, where "%" is a modulo operation.

$$f' = F \% f_s \qquad \text{[Equation 7]}$$

Here, if it is known which band of the original observation band the signal component f' observed by undersampling comes from, a frequency position F in the original band can be calculated. For example, if the band number of the signal component f' is n, the frequency position F can be calculated using the following equation.

$$F = (n-1) \cdot f_s + f' \qquad \text{[Equation 8]}$$

Since in such undersampling, the sampling frequency $f_s$ is lower than the first frequency, it is possible to improve measuring accuracy with less sampling data than the first sampling data. That is, for example, the measurement apparatus 100 determines the value of n by frequency-analyzing the first sampling data with low accuracy being adequate to determine which band the beat signal belongs to. Then, the measurement apparatus 100 observes the signal frequency f' by high-precision undersampling, and calculates the frequency F of the beat signal from Equation 8. By this, the measurement of the frequency F of the beat signal with high accuracy while suppressing the reduction in throughput is expected.

However, as described in FIG. 6, although one beat signal $v_B(m, d)$ exists in the first frequency band by the quadrature detection, a beat signal $v_B(m+1, d)$ differing by m also exists in the negative frequency band of 0 to $-v_c$. When undersampling is performed, in addition to the signal component based on the beat signal $v_B(m, d)$, the signal component based on the beat signal $v_s(m+1, d)$ is superimposed, and it becomes impossible to distinguish which is the beat signal to be observed.

Figure 8:
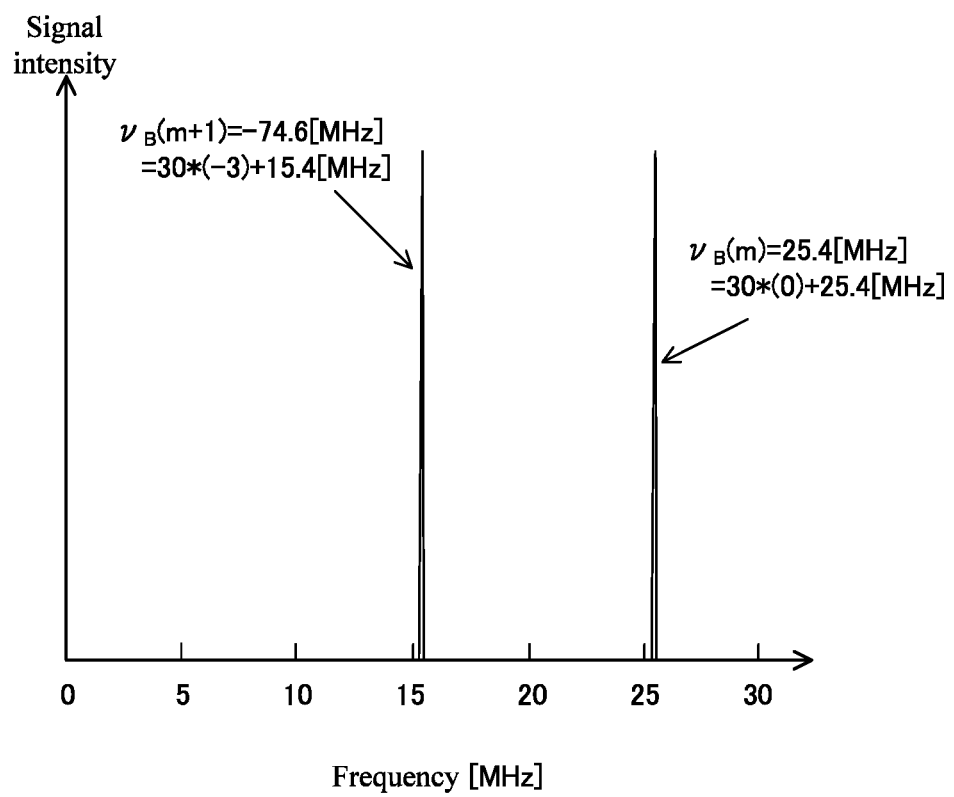
FIG. 8 shows a first example of the result of undersampling performed by the detection part 160 according to the present embodiment.

FIG. 8 shows a first example of a result of undersampling performed by the detection part 160 according to the present embodiment. In FIG. 8, the horizontal axis indicates the frequency, and the vertical axis indicates the signal intensity. FIG. 8 shows examples where $v_c$=100 MHz, $v_B(m, d)$=25.4 MHz, $v_B(m+1, d)$=−74.6 MHz, and undersampling frequency $f_s$=30 MHz. It should be noted that each signal is a sine wave and has approximately the same amplitude value.

The beat signal of the frequency $v_B(m, d)$ is a signal included in Band 1, and the undersampling result will also be located at 25.4 MHz. The beat signal of the frequency $v_B(m+1, d)$ is a signal included in the third band in the negative direction and will be located at 15.4 MHz when the signal is folded back as the signal of a frequency −14.6 MHz by undersampling. In this manner, if undersampling is simply performed, two signal components exist in the observation band, and it is impossible to distinguish the beat signal to be observed.

As described above, it has conventionally been difficult to perform frequency analysis on the beat signal of the measurement apparatus 100 by combining oversampling and undersampling. That is, it has been difficult to improve measurement accuracy while suppressing the reduction in throughput.

The measurement apparatus 100 according to the present embodiment can distinguish the beat signal to be observed by setting the sampling frequency of the undersampling to a frequency corresponding to the resonator frequency of the laser resonator. More specifically, the detection part 160 uses a frequency obtained by dividing the resonance frequency of the laser resonator by a positive integer as a sampling frequency of undersampling. Here, a frequency which is an integer fraction of the resonant frequency $v_c$ of the laser resonator is defined as a second frequency. The positive integer is an integer larger than 0, and, for example, the second frequency is expressed as $v_c/k$ which is $v_c$ divided by k(=1, 2, 3, . . . ).

Then, the detection part 160 performs frequency analysis on the first sampling data and the second sampling data sampled and generated at the second frequency, and detects the difference d between the propagation distances of the reference light and the measurement light. Here, according to Equation 5, the frequency difference between the beat signal $v_B(m, d)$ and the beat signal $v_B(m+1, d)$ is $v_c$. Therefore, supposing that the second frequency $v_c/k$ is the sampling frequency $f_s$, the frequency f observed by undersampling becomes approximately the same frequency regardless of whether the beat signal $v_s(m, d)$ or the beat signal $v_B(m+1, d)$ is substituted into Equation 7.

Figure 9:
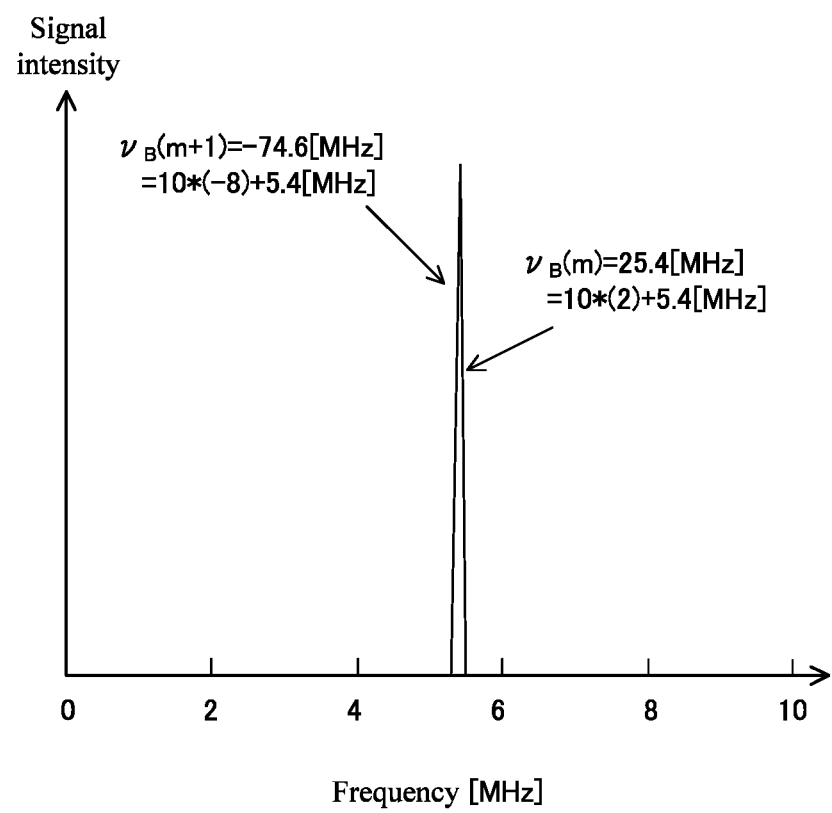
FIG. 9 shows a second example of the result of undersampling performed by the detection part 160 according to the present embodiment.

That is, the frequencies of the beat signal $v_B(m, d)$ and the beat signal $v_B(m+1, d)$ generated by undersampling become approximately the same by setting the sampling frequency as the second frequency. FIG. 9 shows a second example of the result of undersampling performed by the detection part 160 according to the present embodiment. In FIG. 9, the horizontal axis indicates the frequency, and the vertical axis indicates the signal intensity. FIG. 9 shows examples where $v_c$=100 MHz, $v_B(m, d)$=25.4 MHz, $v_B(m+1, d)$=−74.6 MHz, and undersampling frequency $f_s$=10 MHz. That is, k=10. It should be noted that each signal is a sine wave and has approximately the same amplitude value.

The beat signal of the frequency $v_B(m, d)$ is a signal included in Band 3, and the undersampling result is located at 5.4 MHz. The beat signal of the frequency $v_B(m+1, d)$ is a signal included in the eighth band in the negative direction, and a signal of −4.6 MHz due to undersampling is returned to the beat signal, and the beat signal of the frequency $v_B(m+1, d)$ is located at 5.4 MHz. In this manner, by setting the second frequency to a frequency corresponding to the resonator frequency of the laser resonator, it is possible to make two beat signals appear to be one line spectrum.

As described above, since the measurement apparatus 100 according to the present embodiment can discriminate the beat signal to be observed even if the beat signal is undersampled, the difference d in the propagation distance can be detected by combining the undersampling and the oversampling. As described above, the detection part 160 samples the beat signal using the first frequency and the second frequency at different sampling times so that the frequency resolution obtained by frequency analysis of the second sampling data is higher than the frequency resolution obtained by frequency analysis of the first sampling data. As a result, the measurement apparatus 100 can measure the distance d between the optical head part 140 and the object to be measured 10 with high accuracy while suppressing the reduction in throughput. The operation of the measurement apparatus 100 will be described below.

[Operation of the Measurement Apparatus 100]

Figure 10:
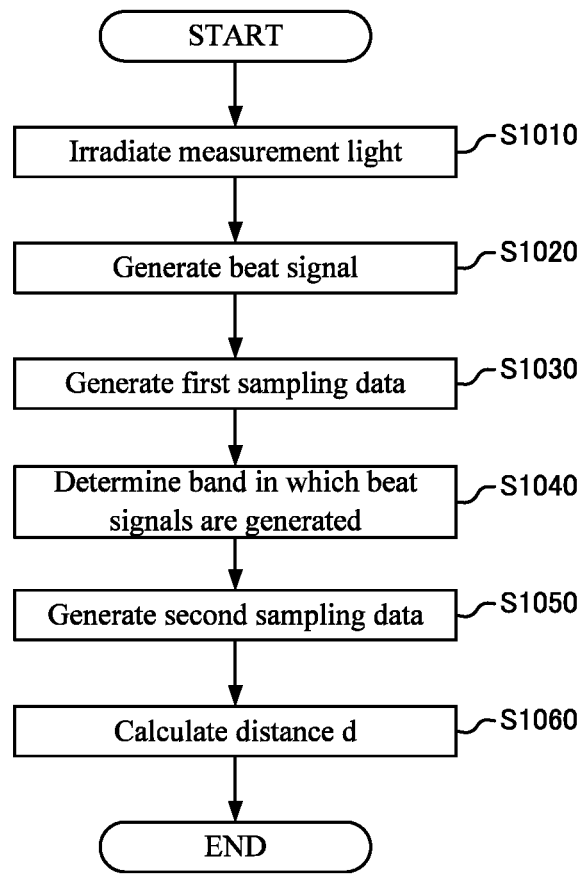
FIG. 10 is a flowchart illustrating one example of an operation of the measurement apparatus 100 according to the present embodiment.

FIG. 10 is a flowchart illustrating one example of an operation of the measurement apparatus 100 according to the present embodiment. The measurement apparatus 100 measures the distance d between the optical head part 140 and the object to be measured 10 by executing the operation from steps S1010 to S1060 of FIG. 10.

First, in step S1010, the laser apparatus 110 having the laser resonator including a frequency shifter and a gain medium outputs a frequency modulated laser beam with a plurality of modes. Then, the branching part 120 branches the frequency modulated laser beam, with a part of it as a reference light and at least some of the remaining part of it as a measurement light. The optical head part 140 irradiates the object to be measured 10 with the measurement light.

Next, in step S1020, the optical head part 140 receives a reflected light reflected from the object to be measured 10. Then, the beat signal generation part 150 mixes the reflected light and the reference light to generate a beat signal. Here, the beat signal generation part 150 may generate beat signals, the signal I and the signal Q, by the quadrature detection.

Next, in step S1030, the detection part 160 samples the beat signals at the first frequency which is equal to or more than twice the resonant frequency of the laser resonator to generate first sampling data. That is, the clock signal supplying part 210 supplies the clock signal of the first frequency to the first AD conversion part 202 and the second AD conversion part 204 to generate the first sampling data.

Next, in step S1040, the detection part 160 determines a band in which beat signals are generated on the basis of the first sampling data. That is, the frequency analyzing part 220 performs frequency conversion of the signals I and Q being the first sampling data to calculate I+jQ. Then, the frequency analyzing part 220 divides the first frequency band being detected by the first frequency into a plurality of bands of the second frequency bandwidth which is detectable by the second frequency, and determines a band, in which the beat signal was generated, from among the divided plurality of bands. For example, the frequency analyzing part 220 determines a band, in which the beat signal was generated, by specifying the value of n in Equation 8.

Next, in step S1050, the detection part 160 samples the beat signal at a second frequency equal to or lower than the resonance frequency of the laser resonator to generate second sampling data. Here, the second frequency is a frequency obtained by dividing the resonance frequency of the laser resonator by a positive integer. That is, the clock signal supplying part 210 supplies the clock signal of the second frequency to the first AD conversion part 202 and the second AD conversion part 204 to generate the second sampling data.

Next, in step S1060, the detection part 160 detects the difference in propagation distance between the reference light and the measurement light based on the frequency analysis results of the first sampling data and the second sampling data. The frequency analyzing part 220 performs frequency conversion of the signal I and the signal Q being the second sampling data to calculate I+jQ. Then, the frequency analyzing part 220 substitutes the values of the frequencies f and n at which the beat signal is generated into Equation 8, and calculates the frequency F in the first frequency band. Then, the frequency analyzing part 220 calculates the distance d between the optical head part 140 and the object to be measured 10 using Equation 6. The display part 170 displays the calculated value of the distance d.

As described above, the measurement apparatus 100 can measure the distance d between the optical head part 140 and the object to be measured 10 at high speed and with high accuracy by sampling the beat signal using the two sampling frequencies. The measurement apparatus 100 may measure a geometry of the object to be measured 10 by repeating the operation shown in FIG. 10 while changing the position at which the frequency modulated laser beam is radiated onto the object to be measured 10.

It should be noted that, in the operation shown in FIG. 10, the example where the generation of the first sampling data of step S1030, the determination of the band in which the beat signal is generated of step S1040, and the generation of the second sampling data of step S1050 are sequentially executed is shown, but the operation is not limited to this. The measurement apparatus 100 may independently perform the generation of the first sampling data and the generation of the second sampling data. For example, the measurement apparatus 100 may execute the generation of the first sampling data of step S1030, the determination of the band in which the beat signal is generated of step S1040, and the generation of the second sampling data of step S1050 in parallel.

Variation Example

In the measurement apparatus 100 according to the present embodiment, the examples have been described above in which the beat signal is sampled at the second frequency corresponding to the resonance frequency of the laser resonator to generate the second sampling data. Here, the laser apparatus 110 may further include a configuration for adjusting the length of the resonator in the resonator, and the second frequency may be adjustable. Next, such laser apparatus 110 will be described.

Figure 11:
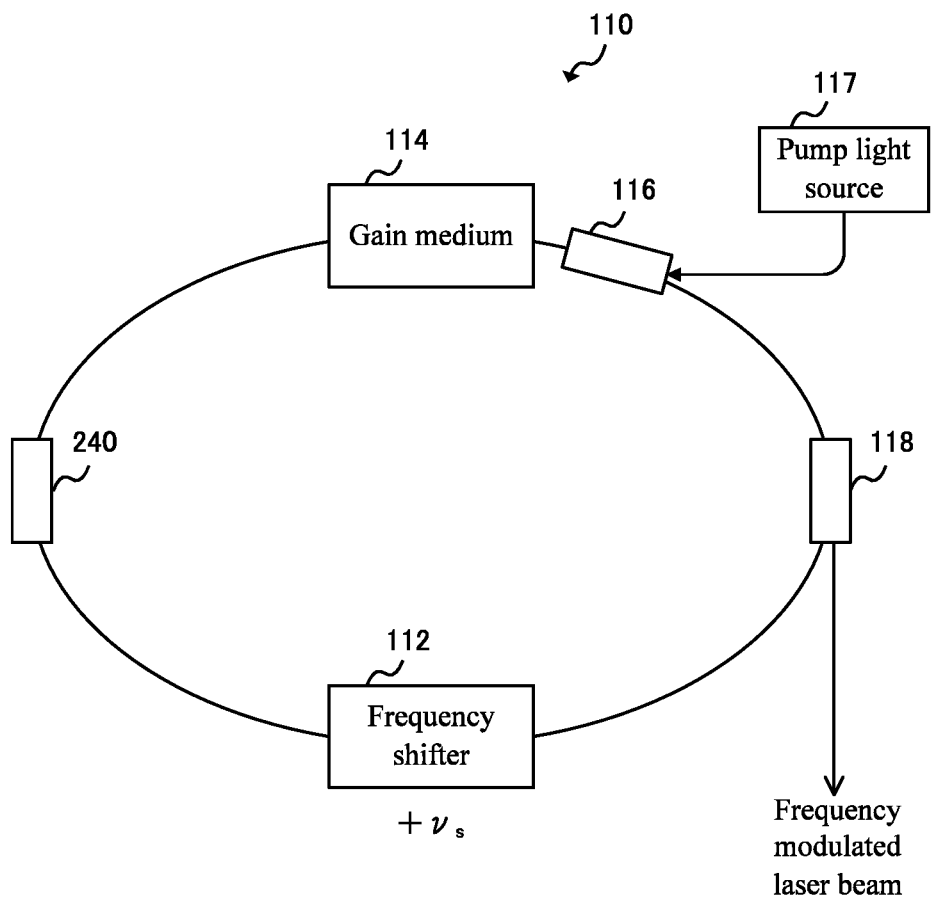
FIG. 11 shows a variation example of the configuration of the laser apparatus 110 according to the present embodiment.

FIG. 11 shows a variation example of the configuration of the laser apparatus 110 according to the present embodiment. In the laser apparatus 110 of the variation example, operations approximately the same as those of the laser apparatus 110 according to the present embodiment shown in FIG. 2 are denoted by the same reference numerals, and the descriptions thereof are omitted. The laser apparatus 110 of the present modification further includes an optical delay part 240 of a variable delay amount type in the laser resonator.

The optical delay part 240 changes the delay time until outputting the input light depending on a control signal or the like supplied from the outside. The optical delay part 240 is, for example, a variable delay line whose optical path length can be adjusted. That is, the optical delay part 240 can adjust the resonator length of the resonator. The optical delay part 240 receives, for example, a control signal for controlling the optical path length from the detection part 160.

In this case, the detection part 160 transmits the control signal to the optical delay part 240 in response to the observation of two line spectra in the frequency analysis result of the second sampling data. The detection part 160 may transmit the control signal to the optical delay part 240 in response to the line width of one line spectrum exceeding a predetermined threshold in the frequency analysis result of the second sampling data.

By doing this, even if the resonance frequency fluctuates due to manufacturing variations, environmental fluctuations, changes in time, or the like of the laser apparatus 110, the laser apparatus 110 can control the resonance frequency and the second frequency to have a predetermined relationship. Also, even if the sampling frequency on the detection part 160 side fluctuates in the same manner, the laser apparatus 110 can control the resonance frequency and the second frequency to have the predetermined relationship.

When the laser apparatus 110 as shown in FIG. 11 is provided, the measurement apparatus 100 preferably further executes the step of adjusting the delay amount of the optical delay part 240 in the operation shown in FIG. 10. The measurement apparatus 100 preferably performs the step of adjusting the delay amount at a stage prior to step S1050 of the operation shown in FIG. 10. For example, the measurement apparatus 100 may perform the step of adjusting the delay amount before executing the operation shown in FIG. 10, or may instead perform the step of adjusting the delay amount immediately before S1050.

In the measurement apparatus 100 according to the present embodiment described above, the examples in which the beat signal is quadrature detected in order to cancel the image signal have been described, but the invention is not limited thereto. The detection part 160 may omit the quadrature detection and may sample the beat signal at the first frequency to perform frequency conversion. In this case, for example, the detection part 160 controls the amount of delay of the optical delay part 240 and observes a change in the frequency at which the beat signal is generated with respect to a change in the resonator length.

When the quadrature detection is omitted, the beat signal and the image signal are observed in the first frequency band. However, since the image signal is folded back in the negative frequency band, changes in the signal frequency with respect to changes in the resonator length in the beat signal and the image signal are opposite to each other. Therefore, the detection part 160 may distinguish between the beat signal or the image signal by detecting whether or not the change in the signal frequency with respect to the change in the resonator length is in the predetermined direction.

If the beat signal can be distinguished, since the frequency position generated by the undersampling can be estimated, the detection part 160 can distinguish the beat signal to be observed even if two line spectra occur in the undersampling. Therefore, the measurement apparatus 100 can measure the distance d between the optical head part 140 and the object to be measured 10 at high speed and with high accuracy even when the quadrature detection is omitted.

In the measurement apparatus 100 of the above-described embodiment, the examples where the detection part 160 samples the beat signal at the first frequency equal to or more than twice the resonant frequency of the laser resonator to determine the band in which the beat signal is generated have been described, but the invention is not limited to this. For example, the detection part 160 may sample the beat signal at the first frequency with a frequency equal to the resonance frequency of the laser resonator as the first frequency. As shown in FIG. 4, when the sampling frequency is the resonant frequency $v_c$, the frequency at which the beat signal $v_B(m, d)$ is generated and the frequency at which the image signal $v_B(m', d)$ is generated approximately match within the observation band, where m'=m+1.

That is, there is no need to separate the beat signal $v_B(m, d)$ and the image signal $v_B(m', d)$. Thus, even if the beat signal is sampled at the first frequency equal to the resonant frequency of the laser resonator, the band in which the beat signal $v_B(m, d)$ is generated can be determined. Therefore, even in such cases, the measurement apparatus 100 can measure the distances d between the optical head part 140 and the object to be measured 10 at high speed and with high accuracy by using the determination result of the generation band of the beat signals $v_B(m, d)$ and the frequency analysis result of the second sampling data.

The present invention is explained on the basis of the exemplary embodiments. The technical scope of the present invention is not limited to the scope explained in the above embodiments and it is possible to make various changes and modifications within the scope of the invention. For example, the specific embodiments of the distribution and integration of the apparatus are not limited to the above embodiments, all or part thereof, can be configured with any unit which is functionally or physically dispersed or integrated. Further, new exemplary embodiments generated by arbitrary combinations of them are included in the exemplary embodiments of the present invention. Further, effects of the new exemplary embodiments brought by the combinations also have the effects of the original exemplary embodiments.

What is claimed is:

1. A measurement apparatus comprising:
    a laser apparatus having a laser resonator including a frequency shifter and a gain medium and outputting a frequency modulated laser beam with a plurality of modes;
    a branch that branches a part of the frequency modulated laser beam output by the laser apparatus as a reference light and at least a part of the remaining part of the frequency modulated laser beam as a measurement light;
    a beat signal generator that generates a beat signal by mixing reflected by irradiating the measurement light to an object to be measured and the reference light; and
    detector circuitry that detects a difference between propagation distances of the reference light and the measurement light using (i) a result obtained by frequency-analyzing first sampling data generated by oversampling the beat signal at a first frequency and (ii) a result obtained by frequency-analyzing second sampling data generated by undersampling the beat signal at a second frequency obtained by dividing a resonance frequency of the laser resonator by a positive integer, wherein
    the first frequency being a frequency greater than the second frequency.

2. The measurement apparatus of claim 1, wherein a quadrature of the beat signal generator detects the reflected light and the reference light.

3. The measurement apparatus according to claim 1, wherein the detector circuitry divides a first frequency band being detectable using the first frequency into a plurality of bands of a second frequency bandwidth which is detected using the second frequency, and determines a band in which the beat signal was generated, from among the divided plurality of bands.

4. The measurement apparatus according to claim 1, wherein the detector circuitry samples the beat signal using the first frequency and the second frequency at different sampling times so that a frequency resolution obtained by frequency analysis of the second sampling data is higher than a frequency resolution obtained by frequency analysis of the first sampling data.

5. The measurement apparatus according to claim 1, wherein the detector circuitry performs frequency analysis using the second sampling data having a smaller number of pieces of data than the first sampling data.

6. The measurement apparatus according to claim 1, wherein the laser apparatus includes an optical delay of a variable delay amount type in the laser resonator.

7. The measurement apparatus according to claim 6, wherein the detector circuitry transmits a control signal for adjusting a delay amount to the optical delay when a line width of one line spectrum exceeds a threshold value in frequency analysis of the second sampling data.

8. A measurement method comprising:
    outputting a frequency modulated laser beam with a plurality of modes from a laser apparatus that has a laser resonator including a frequency shifter and a gain medium;
    branching a part of the frequency modulated laser beam as a reference light and at least some of the remaining part of the frequency modulated laser beam as a measurement light;
    generating a beat signal by mixing the reflected light reflected by irradiating the measurement light to an object to be measured and the reference light;
    generating first sampling data by oversampling the beat signal at a first frequency and frequency-analyzing the generated first sampling data;
    generating second sampling data by undersampling the beat signal at a second frequency obtained by dividing a resonance frequency of the laser resonator by a positive integer and frequency-analyzing the generated second sampling data; and detecting a difference between propagation distances of the reference light and the measurement light using a frequency analysis results of the first sampling data and a frequency analysis result of the second sampling data, wherein the first frequency being a frequency greater than the second frequency.

9. The measurement method according to claim 8, further comprising
dividing a first frequency band being detectable by the first frequency into a plurality of bands of a second frequency bandwidth which is detected by the second frequency based on the first sampling data to determine a band, in which the beat signal was generated, from among the divided plurality of bands.

10. The measurement method according to claim 8, wherein the laser apparatus includes an optical delay of a variable delay amount type in the laser resonator, and the method further comprises:

adjusting a delay amount of the optical delay so that the resonance frequency of the laser resonator and the second frequency have a predetermined relationship.

11. The measurement apparatus according to claim 1, wherein the first frequency is a frequency equal to or more than twice the resonance frequency of the laser resonator.

12. The measurement apparatus according to claim 1, wherein the detector observes a frequency of the beat signal by distinguishing a band in which the beat signal is generated using the result obtained by frequency-analyzing the first sampling data generated by oversampling the beat signal at the first frequency, and by generating second sampling data by undersampling the beat signal at a second frequency which can detect a bandwidth of the distinguished band and by performing frequency analysis on the generated second sampling data.

* * * * *